United States Patent
Katz et al.

(10) Patent No.: US 8,998,295 B2
(45) Date of Patent: Apr. 7, 2015

(54) SIDEWALL CONSTRUCTION FOR TRAILER

(71) Applicant: Strick Corporation, Fairless Hills, PA (US)

(72) Inventors: Frank Katz, Monroe, IN (US); James J. Jackson, Leo, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 6 days.

(21) Appl. No.: 13/862,064

(22) Filed: Apr. 12, 2013

(65) Prior Publication Data

US 2013/0221702 A1    Aug. 29, 2013

Related U.S. Application Data

(63) Continuation of application No. 12/710,216, filed on Feb. 22, 2010, now Pat. No. 8,419,110.

(51) Int. Cl.
*B62D 65/02* (2006.01)
*B62D 33/04* (2006.01)

(52) U.S. Cl.
CPC .............. *B62D 33/046* (2013.01); *B62D 65/02* (2013.01)

(58) Field of Classification Search
USPC ............... 296/186.1; 410/115, 113; 52/582.1; 29/897.2
See application file for complete search history.

(56) References Cited

U.S. PATENT DOCUMENTS 6,412,854 B2 * 7/2002 Ehrlich .......................... 296/191

* cited by examiner

*Primary Examiner* — Glenn Dayoan
*Assistant Examiner* — Melissa A Black
(74) *Attorney, Agent, or Firm* — Keith J. Swedo; Bingham Greenebaum Doll LLP

(57) ABSTRACT

A sidewall construction arrangement for a trailer includes a plurality of upstanding panels. Each panel includes two opposing flanges. The flanges are disposed on opposing lateral edges of the panel. Adjacent flanges of two adjacent panels partially overlap each other. Each of a plurality of vertically oriented logistics posts includes two lateral margins. A first of the margins is attached to a respective first of the flanges of the two partially overlapping panels. A second of the margins of the post is attached to each of the first and second flanges of the two partially overlapping panels.

18 Claims, 8 Drawing Sheets

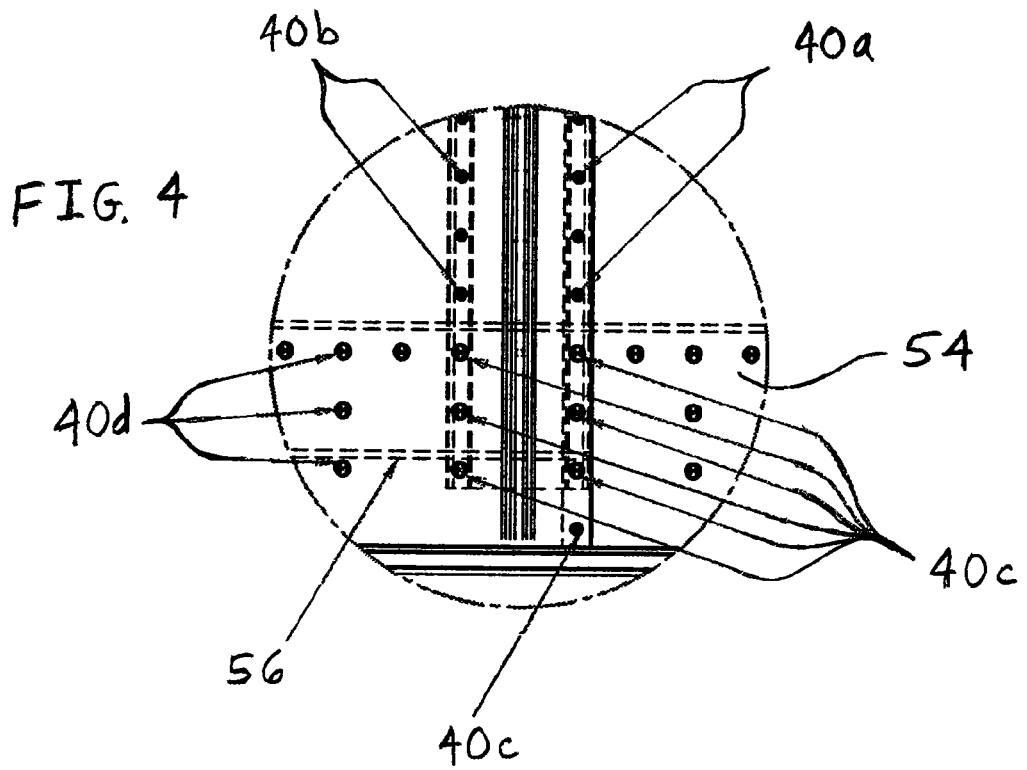
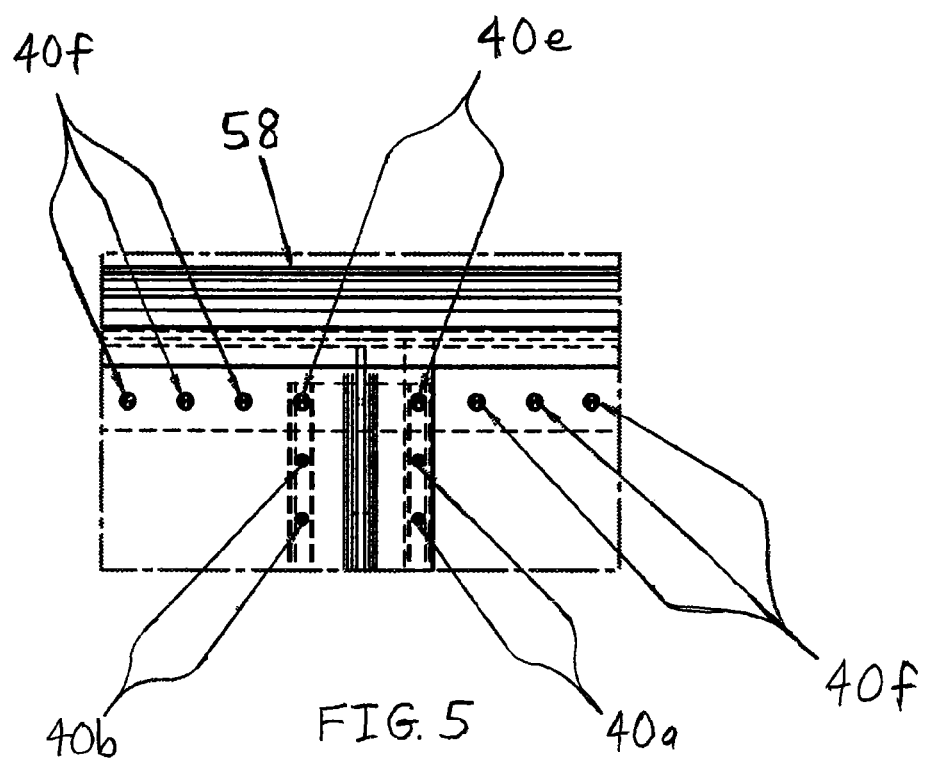

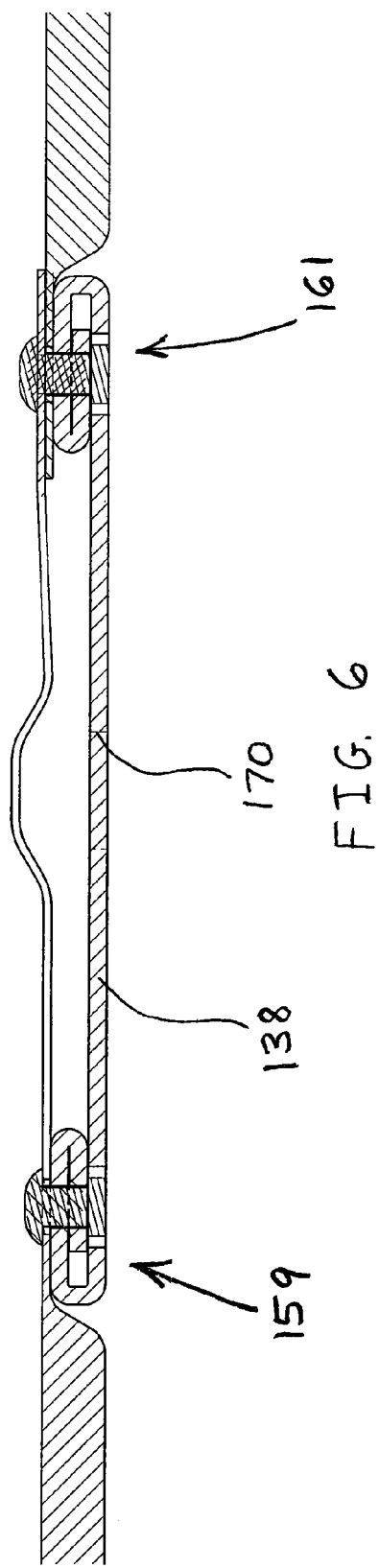

SIDEWALL CONSTRUCTION FOR TRAILER

BACKGROUND

The present invention relates to trailers, containers and other transport vehicles and, more particularly, to the sidewall structure of such trailers, containers or transport vehicles.

Transport vehicles, trailers and containers typically include a cargo space enclosed by a plurality of walls and a roof. Objects needing transport from one place to another are loaded into the cargo space and are protected from rain, snow, ice, dirt, road debris and other elements as well as from theft during transport by the roof and walls of a trailer. The sidewalls and front panel of the trailer commonly include a plurality of aluminum sheet or plate (in thickness above 1/16 of an inch), steel sheet, fiberglass reinforced plywood or other composite material (generally made of metal facings laminated onto plastic or other material) cut and formed into sheets or panels which are attached to each other in series at their opposite side edges. Sometimes the sidewalls will include vertical supports ("posts") as well as the sheets or panels to provide for strength, stiffness or cargo restraints. The trailer also generally includes at least one door allowing access to the cargo space and often this door is on the rear wall of the trailer. The trailer will also have a roof and floor arrangement which may rely on the sidewalls integrity.

Oftentimes, the objects needing to be transported are stacked on pallets in the cargo space. Sometimes, pallets are stacked in multiple levels either directly on each other or more commonly on platforms supported by cargo restraint systems. The stacked objects may be unloaded from the cargo space using a fork lift or other mechanical device which elevates the objects from the floor. As the objects are lifted from the floor and as they are moved through the cargo space, the objects or pallets may hit or scrape against the side edges of the sidewalls, potentially causing damage to the objects themselves or to the sidewalls and/or roof or contributing to delays in the loading or unloading process.

In the design and construction of trailers and other cargo carriers, it is important to maximize space within the interior of the housing for the purpose of carrying cargo. In that regard, it is desired that the walls of the housing, in particular the internal sidewalls, be as thin as possible so as not to impinge on available cargo space. At the same time, it is important to provide for lateral strength in the sidewall to protect against bulging or deformation of the sidewalls when cargo is loaded or shifts during transit against the sidewall, vertical strength in the sidewalls to carry and support the loads that are placed on the floor and impact resistance in the sidewalls to protect against damage.

In the design and construction of trailers and other cargo carriers, it is also important to protect against unnecessary damage to the housing and to the cargo. For this reason, it is desirable to have a minimal number of protrusions or obstructions in the interior of the sidewall that could catch or snag cargo, penetrate boxes or packing material or provide any type of catch to facilitate damage to the sidewall during loading, unloading or transit.

It is further desired to provide mounting points along the interior of the cargo container for cargo restraint systems and other purposes. Such mounting points may be obtained by incorporating specific cutouts or apertures into the inside surfaces of the trailer. These apertures can be incorporated into vertical logistics posts which are often inserted into the joining means between adjacent panels or by mounting horizontal logistic track in or onto the sidewalls or simply by cutting into certain types of side panels. The strengths of these systems vary, but in all cases space must be provided behind the apertures to allow the bars or straps used to engage.

In trailer sidewalls built with composite panels, the use of offset portions of the panels to form a recessed channel between adjacent panels can be used to allow for some of the space necessary to engage the logistics bars or straps. Additional space has been created in some applications by adding a cap strip or cover at the joining between panels in order to allow the interior surface of the trailer to be maintained at or close to flush at this joining.

SUMMARY

The present invention provides a trailer including a sidewall having a plurality of partially overlapping composite side panels. Each pair of overlapping side panels conjunctively forms a recess facing the interior of the trailer. Each of a plurality of posts or logistics posts is used within the interior of the trailer and is located within the recess formed by two corresponding adjacent side panels. During manufacture, a lateral margin of the post may be riveted to a non-overlapping portion of a first of the two corresponding side panels within the recess. Then, a lateral margin of a second of the two corresponding side panels may be inserted between the first side panel and the post, and the two side panels and the post may all be riveted together within or at the edge of the area of the recess.

The invention comprises, in one form thereof, a sidewall construction arrangement for a trailer. The arrangement includes a plurality of upstanding composite panels. Each panel includes two opposing flanges. The flanges are disposed on opposing lateral edges of the panel. Adjacent flanges of two adjacent panels partially overlap each other. Each of a plurality of vertically oriented posts or logistics posts includes two lateral margins. A first of the margins is attached to a respective first of the flanges of the two partially overlapping panels. The first margin is unattached to a second of the flanges of the two partially overlapping panels. A second of the margins of the post is attached to each of the first and second flanges of the two partially overlapping panels.

The invention comprises, in another form thereof, a method of constructing a trailer, including providing a plurality of upstanding composite panels. Each panel includes two opposing flanges. The flanges are disposed on opposing lateral edges of the panel. A first lateral margin of a post or logistics post is attached to a proximal end of a first flange of a first panel. After the post has been attached to the first flange of the first panel, a second flange of a second panel is inserted between a distal end of the first flange of the first panel and a second lateral margin of the post. After the inserting step, attached together are each of the second flange of the second panel, the distal end of the first flange of the first panel, and the second lateral margin of the post.

The invention comprises, in yet another form thereof, a sidewall construction arrangement for a trailer. The arrangement includes a plurality of upstanding composite panels. Each panel includes a body portion and two opposing flanges. The flanges extend from opposing lateral edges of the body portion. Adjacent flanges of two adjacent panels partially overlap each other such that the overlapping flanges and the body portions of the adjacent panels conjunctively form a pocket. Each of a plurality of vertically oriented posts or logistics posts is received in a respective pocket and includes two lateral margins. A first margin is attached to a respective first of the flanges of the two partially overlapping panels. The first margin is unattached to a second of the flanges of the two partially overlapping panels. A second margin of the post is attached to each of the first and second flanges of the two partially overlapping panels.

An advantage of the present invention is that the transport vehicle, container or trailer provides a relatively thin and damage resistant sidewall composed of composite panels and with a smooth interior surface while at the same time being easier to manufacture than other designs.

Another advantage of the present invention is that the transport vehicle, container or trailer provides a relatively thin and damage resistant sidewall composed of composite panels and with a smooth interior surface while at the same time being able to carry more or more concentrated weight on the trailer floor due to the structural vertical posts than other designs.

Yet another advantage of the present invention is that the transport vehicle, container or trailer provides a relatively thin and damage resistant sidewall composed of composite panels and with a smooth interior surface while at the same time being more resistant to bending, flexing and fatigue or other sidewall damage and distortion than other designs.

Still another advantage of the present invention is that the transport vehicle, container or trailer provides a relatively thin and damage resistant sidewall composed of composite panels and with a smooth interior surface which can support heavier and more diverse loads that are restrained by or elevated by bars tied to apertures in the vertical logistics posts than other designs.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 4 is an enlarged view of encircled region 4 of FIG. 1;

FIG. 5 is an enlarged view of rectangular region 5 of FIG. 1;

FIG. 6 is a top cross-sectional of another embodiment of a sidewall construction of the present invention;

FIG. 7b is a fragmentary perspective view of the post of the construction of FIG. 7a.

Figure 1:
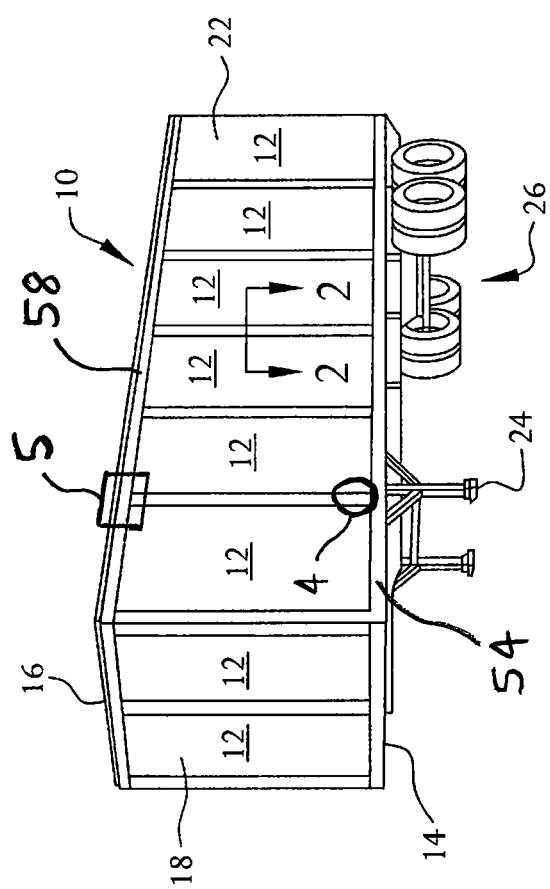
FIG. 1 is a perspective view generally showing a trailer, which is one type of cargo container that may incorporate the features of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 shows a perspective view of a trailer 10. The present invention is not restricted to a trailer, but more broadly relates to the construction of cargo containers and transport vehicles, including trailer bodies adapted to be hauled by tractor units (not shown). The terms "trailer", "container", "cargo container" and "transport vehicle" are used interchangeably herein and each such term is meant to designate a partially-closed or closed, hollow structure for carrying cargo. The trailer 10 includes a roof 16, a floor 14, a front wall 18, a pair of sidewalls 22, and a rear cargo door (not shown). The trailer 10, as illustrated in FIG. 1, may include provisions at the base thereof for a running gear 26 and a landing gear 24 in which case the trailer support assembly or running gear 26 is positioned adjacent to or near the rear end of the trailer and the landing gear 24 is positioned forward of the running gear 26 and is used to support the trailer when a tractor is not attached. Between the landing gear 24 and the running gear 26 the floor may be supported by a frame or may simply rely on the strength of the sidewall.

The trailer sidewall 22 includes a plurality of vertical upstanding composite manufacture side panels 12. Each composite panel may have a predetermined length, height, width and thickness, however, any or all of these parameters may or may not vary from panel to panel. In the embodiment shown in FIG. 2, at least portions of which are in accordance with commonly assigned U.S. Pat. No. 5,992,117, herein incorporated by reference, each composite panel 12 includes a first lateral body portion 28 and an opposite second lateral body portion 30. Each composite panel 12 also includes a first lateral flange 32 adjacent to first lateral body portion 28, and a second lateral flange 34 adjacent to second lateral body portion 30. First lateral flange 32 and second lateral flange 34 are parallel to and abut each other. First lateral flange 32 may include a rib 35 defining a channel extending the entire vertical length of flange 32. Rib 35 provides additional space within air gap 66 for the attachment of cargo restraints through apertures 57, as apertures 57 and air gap 66 may be in fluid communication. Thus, rib 35 may be aligned with at least one of apertures 57 in a horizontal direction. In addition, rib 35 may provide flange 32 with increased resistance to being bent over about a horizontal axis as well as a buffer for thermal contraction.

Figure 3:
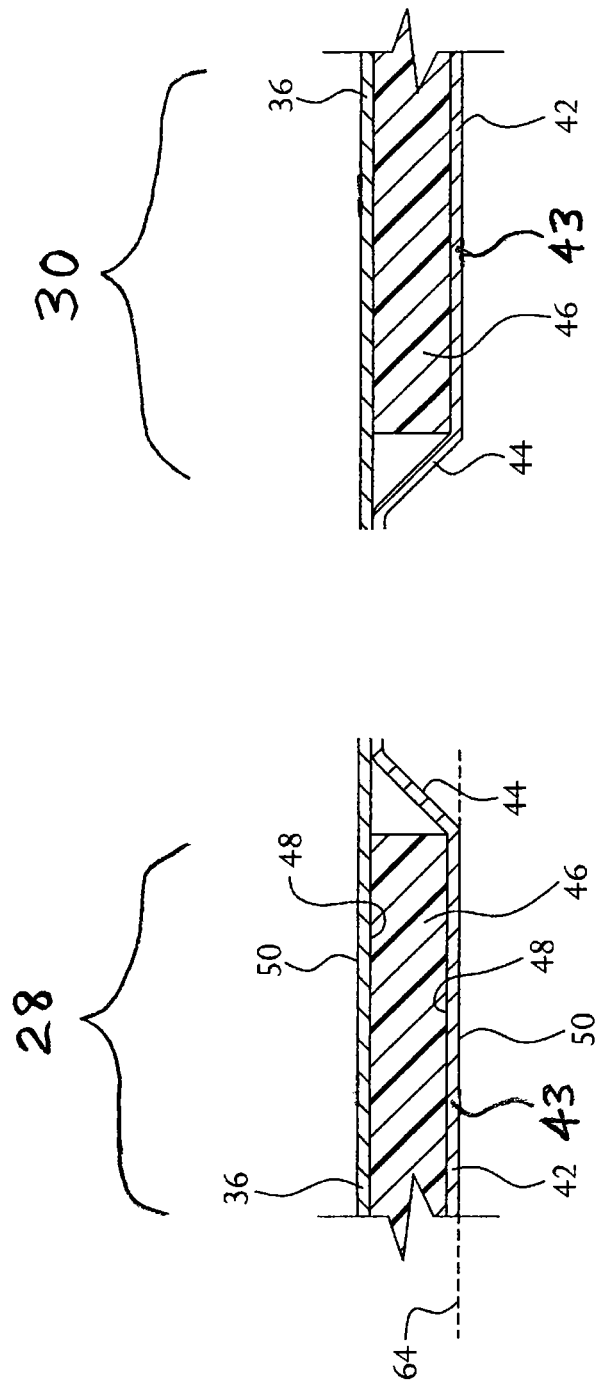
FIG. 3 is an enlarged view of bracketed regions 28 and 30 of FIG. 2.

A post 38 is attached to first lateral flange 32 by a rivet or other fastener 40a, and is attached to second lateral flange 34 by a rivet or other fastener 40b. The position and countersinking of each rivet and the use of rivets is shown for convenience but other fastening methods and arrangements are possible to attach composite panels to each other and to posts. Each of first lateral body portion 28 and second lateral body portion 30 may include an outside face member 36, which is shown in the fragmentary enlarged view of FIG. 3. Each of first lateral body portion 28 and second lateral body portion 30 may also include an inside face member 42 having a body portion 43 and an inclined portion 44. Inclined portion 44 may connect the body portion 38 to either first lateral body portion 28 or second lateral body portion 30. Each of first lateral body portion 28 and second lateral body portion 30 may also include a core member 46 sandwiched between and preferably bonded between outside face member 36 and the body portion 43 of the inside face member 42.

On any composite panel, each face member 42 has an inner surface 48 and an outer surface 50. In the present invention, the outside face member 36 of first lateral body portion 28 of one lateral body portion is co-planar and overlaps with at least one segment of first lateral flange 32 of a second body portion. Outside face member 36 of second lateral body portion 30 is co-planar with second lateral flange 34 of the same body portion. Outside face member 36 is oriented parallel to the body portion 43 with the core 46 positioned between the outside face member 36 and the body portion 43.

The outer surface 50 of the outside face member 36 forms the exterior surface of the trailer. The inner surface 48 of the outside face member 36 directly contacts the core 46. The interior surface of the container is formed by the outer surface 50 of the inside face member 42 along with an inner surface 52 of post 38. The inclined portions 44 of the inside face member 42 form a "step," "pocket," "recess," or "offset" which receives post 38 in the interior surface of the container. By forming the sidewall panel 12 with a pocket, two adjacent panels may be attached to one another and to post 38 without post 38 projecting inwardly beyond the inside surface of the sidewall 22.

Joining means is provided at a joint where adjoining panels 12 and/or post 38 overlap. As illustrated in FIG. 4, the joining means may be a series of rivets aligned in a direction into the page of FIG. 2. The rivets (e.g., 3/16 inch rivets on 2 inch centers) are preferably positioned along the overlapping flanges of the panels and/or post 38.

Trailer 10 includes a bottom rail 54 shown in FIGS. 1 and 4 and that is indicated in FIG. 4. The side panel connection to the bottom rail may be protected by foam tape 56. Foam tape may be used in other joints as well. Rivets 40c may be used to attach panels 12 and posts 38 to rail 54. Rivets 40d may be used to attach panels 12 to bottom rail 54. Alternatively, adhesive bonds, threaded fasteners (e.g., screws, bolts), seam welding, spot welding, nails or pins along the joints may be used.

Trailer 10 includes a top rail 58 shown in FIGS. 1 and 5. Rivets 40e may be used attach panels 12 and posts 38 to top rail 58. Rivets 40f attach panels 12 to top rail 58. Alternatively, adhesive bonds, threaded fasteners (e.g., screws, bolts), seam welding, spot welding, nails or pins along the joint may be used.

As described above, the joinder of the composite panels 12 includes post or logistics post 38 which provides structural mounting points for attaching restraints to the container wall. The mounting points can include vertically-aligned apertures 57, one of which is shown in FIG. 1. Apertures 57 are through the logistics post 38 and may be used for connecting restraints.

Figure 2:
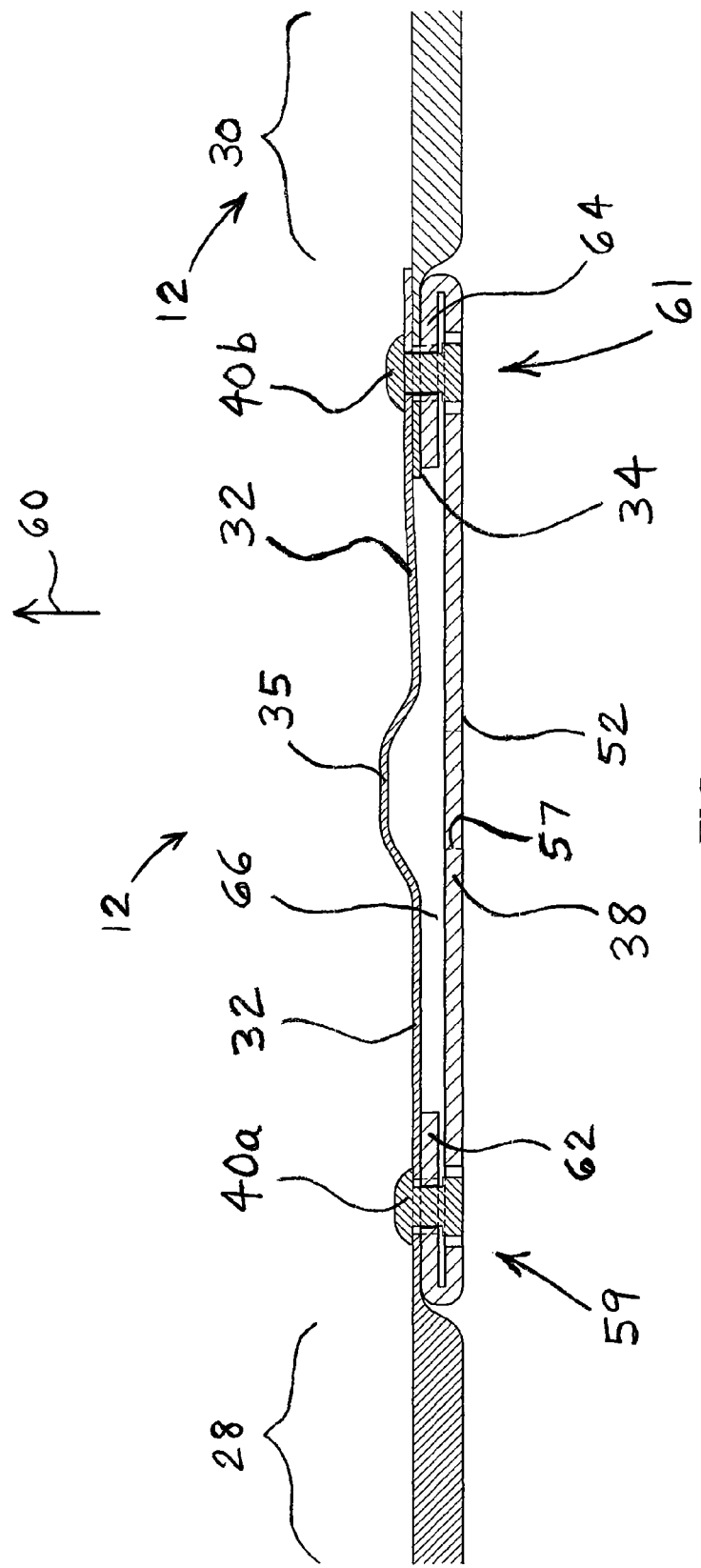
FIG. 2 is a top cross-sectional view taken along line 2-2 of FIG. 1.

The logistics post 38 illustrated in FIG. 2 is a substantially flat rectangular sheet or plate that is doubled over on each of its two lateral margins 59, 61. Rivets 40a-b are attached through the doubled over portion of post 38 on each of the two lateral margins. The thickness of post 38 in the doubled over margins is approximately equal to the depth of the pocket formed by the joinder of adjacent panels 12 such that inner surface 52 of post 38 and the outer surfaces 50 of the inside face members 42 conjunctively form a smooth inner surface on the inside of trailer 10.

As shown in FIG. 2, the folded over side of post 38 faces in an outer direction 60 toward the exterior of trailer 10. That is, folded over section 62 of post 38 faces and abuts against first lateral flange 32, and folded over section 64 of post 38 faces and abuts against second lateral flange 34. This orientation of post 38 has the advantage of having the smooth, continuous side of post 38 facing the interior of trailer 10 such that post 38 does not present any sharp edges on which to snag cargo inside trailer 10. Another advantage of the orientation of post 38 shown in FIG. 2 is that it provides an air gap 66 between first lateral flange 32 and post 38. Thus, if anything were to collide against the outside of first lateral flange 32, then flange 32 may merely be dented or bent into air gap 66 without making contact with and possibly damaging post 38. Yet another advantage of having air gap 66 is that it enables restraints to be latched onto apertures 57 in post 38. That is, a portion of the restraints may enter into air gap 66 through apertures 57 in order to latch onto post 38.

Figure 7A:
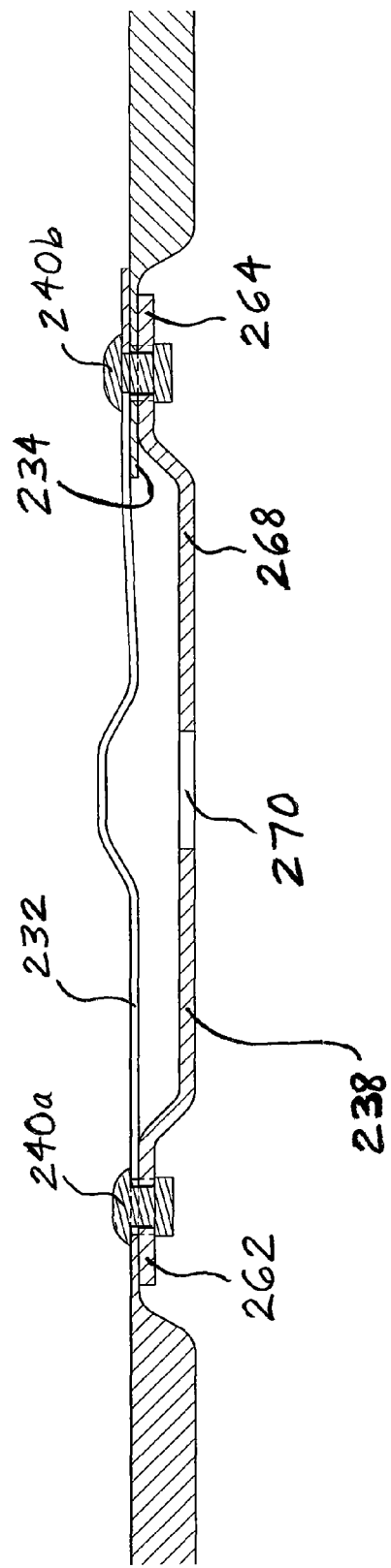
FIG. 7a is a top cross-sectional of yet another embodiment of a sidewall construction of the present invention.

During manufacture, logistics post 38 (or alternatively posts such as 138 or 238 as shown in FIGS. 6 and 7a) may be first joined to only first lateral flange 32 by attachment of rivets 40a along the entire vertical height of post 38 and of flange 32. After the insertion of rivets 40a, which attaches post 38 to flange 32, second lateral flange 34 may be inserted between the unattached edges of flange 32 and post 38. Lastly, rivets 40b may be inserted to thereby attach flanges 32, 34 and post 38 together.

FIG. 6 shows another embodiment of a post 138 of the present invention in which each of the post's lateral margins 159, 161 are folded over twice instead of only once as in the embodiment of FIG. 2. Whether the post is folded over once as in FIG. 2 or twice as in FIG. 6 may depend upon the relative thicknesses of the post and of the composite panel. That is, the sheet metal of the post may be selected such that folding over the post once or twice approximately matches the depth of the pocket formed by the panels. Thus, the thickness of the post sheet metal may be chosen such that doubling or tripling of the sheet metal thickness approximately matches the depth of the panel pocket. In this way, a smooth, continuous inner surface may be provided within the trailer. Post 138 may include a plurality of vertically-aligned apertures 170, one of which is shown in FIG. 6. Other features of the embodiment of FIG. 6 are substantially similar to those of the embodiment of FIG. 2, and thus are not described herein in order to avoid repetition.

Figure 7B:
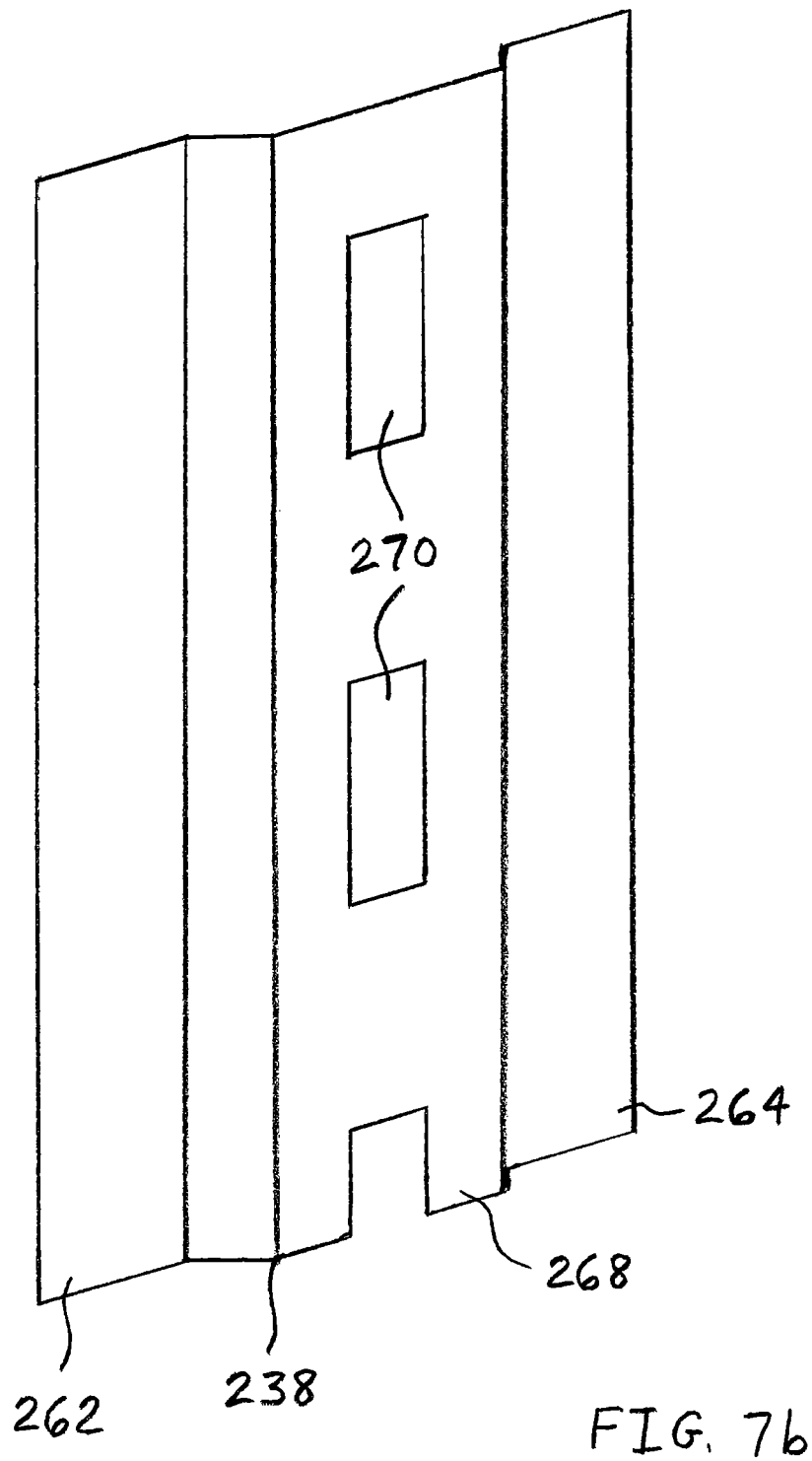

FIG. 7a shows yet another embodiment of a post 238 of the present invention. Lateral margins in the form of opposing legs 262, 264 extend from a body 268 of post 238. Post 238 may be formed by bending sheet metal such that legs 262, 264 are substantially co-planar with each other, and substantially parallel to body 268 of post 238. Post 238 can also be formed by rolling, or, in the case of aluminum, by extruding, or, in the case of fiberglass, by pultruding. Leg 262 is attached to first lateral flange 232 by a rivet 240a. Rivet 240b attaches each of leg 264, first lateral flange 232 and second lateral flange 234 together. Post 238 may include a plurality of vertically-aligned apertures 270, one of which is shown in FIG. 7a. Post 238 and this example of an aperture 270 may be best seen in FIG. 7b.

Although this description has been directed to the panels 12 of the sidewalls 22, it should be recognized that panels 12 with overlapping edges and posts 38, 138 and/or 238 may also be used to provide the front wall 18 of a trailer 10 or other cargo carrier. In such an arrangement, means may be provided to allow for access in the rear (not shown) of the trailer or cargo carrier.

The offset positioning of the joint between the panels and the post serves to protect the panels and post since the panels, post and rivets conjunctively provide the trailer with a substantially smooth and continuous inner surface. A cargo and fork lift is therefore less likely to peel off the joint during loading and unloading. Preferably, any small edges presented on the trailer inner surface are rounded making them less likely to be engaged or torn.

As noted above, an advantage of the present invention is that it may reduce the likelihood of damage to a surface of the container by creating a smooth transition between the panels and the post, and thereby also providing a smooth inside surface. Further, the rivets or other fastening means are flush with, or may be below the plane of the inner surface.

Figure 8:
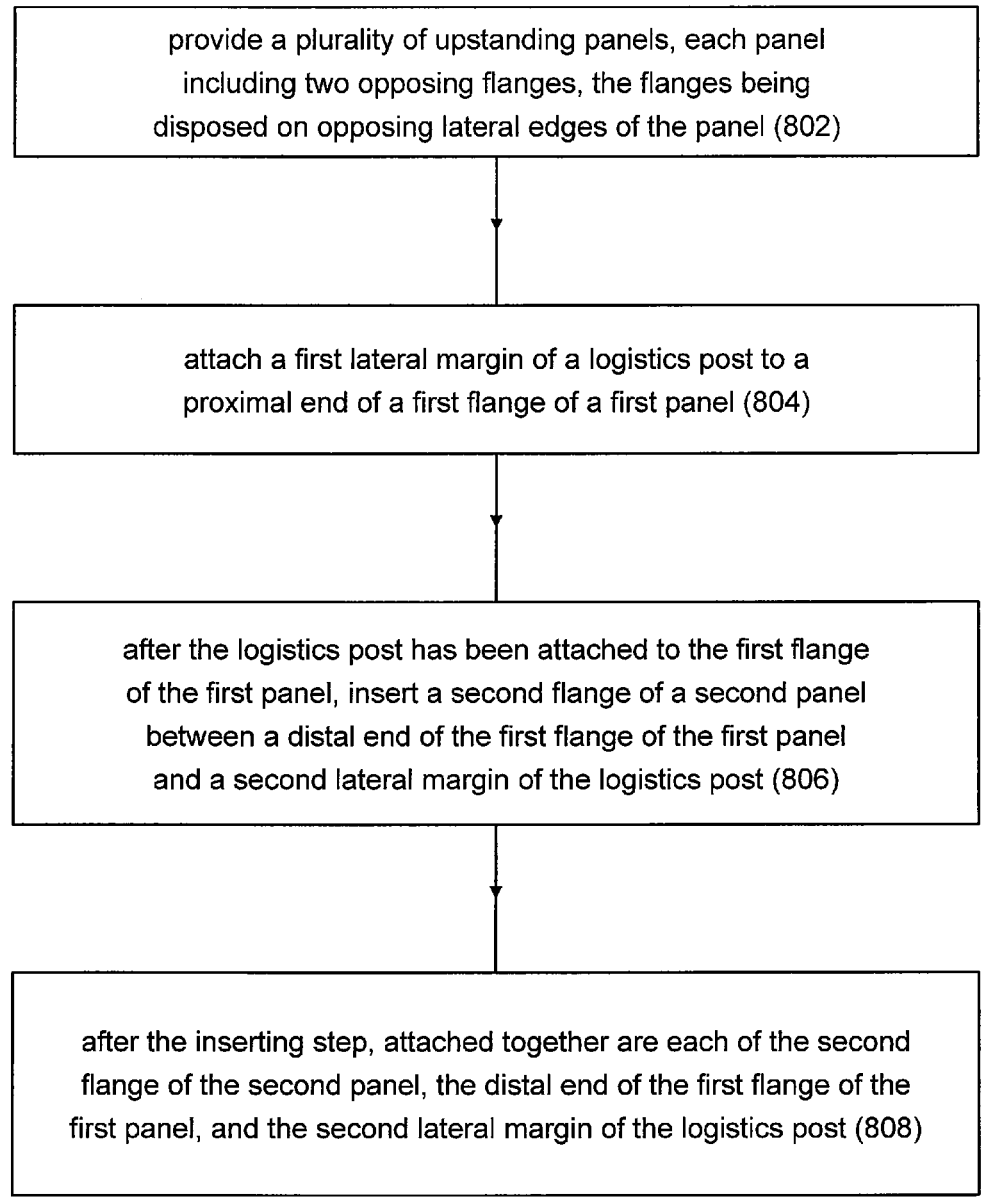
FIG. 8 is one embodiment of a method of the present invention for constructing a trailer.

Illustrated in FIG. 8 is one embodiment of a method 800 of the invention for constructing a trailer. In a first step 802, a plurality of upstanding panels is provided. Each panel includes two opposing flanges. The flanges are disposed on opposing lateral edges of the panel. For example, panels 12 are provided. Each panel 12 includes two opposing flanges 32, 34. Flanges 32, 34 are on opposing lateral edges of panels 12.

In a next step 804, a first lateral margin of a post is attached to a proximal end of a first flange of a first panel. In the embodiment shown in FIG. 2, first lateral margin 59 of post 38, 138 or 238 is attached by rivets 40a to a proximal end of first flange 32.

Next, in step 806, after the post has been attached to the first flange of the first panel, a second flange of a second panel is inserted between a distal end of the first flange of the first panel and a second lateral margin of the logistics post. Continuing with the embodiment of FIG. 2 as an example, after first lateral margin 59 of post 38, 138 or 238 has been attached by rivets 40a to a proximal end of first flange 32, flange 34 of the other panel 12 is inserted between the distal end of first flange 32 and second lateral margin 61 of post 38, 138 or 238.

In a final step 808, after the inserting step, attached together are each of the second flange of the second panel, the distal end of the first flange of the first panel, and the second lateral margin of the logistics post. That is, rivets 40b may attach together flange 34, the distal end of first flange 32, and second lateral margin 61 of post 38,138 or 238 as shown in FIG. 2.

The above descriptions are not intended to limit the application of the invention to creating the joint between the panels and posts only on the interior of a container. If the exterior surface requires restraining points as provided by the posts, then the arrangement of the invention can function to form the exterior surface of the container.

The present invention has been described herein as being applied to a trailer. However, it is to be understood that the invention is also applicable to all other types of containers and vehicles.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sidewall construction arrangement for a trailer, said arrangement comprising:
    a plurality of upstanding composite panels, each said panel including two opposing flanges, the flanges being disposed on opposing lateral edges of the panel, adjacent said flanges of two adjacent said panels partially overlapping each other; and
    a plurality of vertically oriented posts, each said post including two lateral margins, a first said margin being attached to a respective first of said flanges of said two partially overlapping panels, said first margin being unattached to a second of said flanges of said two partially overlapping panels, a second said margin of said post being attached to each of said first and second flanges of said two partially overlapping panels, each said post being formed of sheet metal and including a body interconnecting said two margins, the sheet metal being doubled or tripled over in the margins.

2. The arrangement of claim 1 wherein said panels conjunctively form a surface having a plurality of recesses, each said post being received in a respective said recess.

3. The arrangement of claim 1 wherein said second flange is sandwiched between said first flange and said second margin.

4. The arrangement of claim 1 wherein said panels and said posts conjunctively form a substantially smooth surface.

5. The arrangement of claim 1 wherein each said post, a respective said first flange, and a respective said second flange define an air gap therebetween, each said post including at least one aperture, each said aperture being in communication with a corresponding said air gap.

6. A method of constructing a trailer, comprising the steps of:
    providing a plurality of upstanding panels, each said panel including two opposing flanges, the flanges being disposed on opposing lateral edges of the panel;
    forming a rib in a first said flange of a first said panel;
    forming a post from sheet metal, said forming including doubling or tripling over said sheet metal in at least one of said lateral margins of said post;
    providing at least one aperture in the post for attaching a cargo restraint to said post through said at least one aperture;
    attaching a first lateral margin of the post to a proximal end of the first flange of the first panel such that said rib is aligned with the at least one aperture in a horizontal direction;
    after the post has been attached to said first flange of said first panel, inserting a second flange of a second said panel between a distal end of said first flange of said first panel and a second lateral margin of said post; and
    after the inserting step, attaching together each of:
        said second flange of said second said panel;
        said distal end of said first flange of said first panel; and
        said second lateral margin of said post.

7. The method of claim 6 wherein each of said attaching steps includes riveting.

8. A method of constructing a trailer, comprising the steps of:
    providing a plurality of upstanding panels, each said panel including two opposing flanges, the flanges being disposed on opposing lateral edges of the panel;
    forming a rib in a first said flange of a first said panel;
    forming a post from sheet metal, said forming including bending the sheet metal such that said margins are substantially co-planar with each other, and substantially parallel to a body of said post;
    providing at least one aperture in the post for attaching a cargo restraint to said post through said at least one aperture;
    attaching a first lateral margin of the post to a proximal end of the first flange of the first panel such that said rib is aligned with the at least one aperture in a horizontal direction;
    after the post has been attached to said first flange of said first panel, inserting a second flange of a second said panel between a distal end of said first flange of said first panel and a second lateral margin of said post; and
    after the inserting step, attaching together each of:
        said second flange of said second said panel;
        said distal end of said first flange of said first panel; and
        said second lateral margin of said post.

9. The method of claim 8 wherein the rib has an outwardmost portion aligned with said at least one aperture.

10. The method of claim 8 wherein the first flange includes a first portion disposed on a first lateral side of the rib and a second portion disposed on a second lateral side of the rib, the rib protruding outwardly beyond each of the first and second portions of the flange.

11. A sidewall construction arrangement for a trailer, said arrangement comprising:
   a plurality of upstanding composite panels, each said panel including a body portion and two opposing flanges, the body portion including a core sandwiched between an inside face member and an outside face member, the flanges each including both the inside face member and the outside face member, the flanges extending from opposing lateral edges of the body portion, adjacent said flanges of two adjacent said panels partially overlapping each other such that the overlapping flanges and the body portions of said adjacent panels conjunctively form a pocket, the pocket being disposed inward of the inside face member, at least one of the flanges including a rib that protrudes outside a plane of an exterior face of the panels; and
   a plurality of vertically oriented logistics posts, each said post being received in a respective said pocket and including two lateral margins, a first said margin being attached to a first and/or a second of said flanges of said two partially overlapping panels, a second said margin of said post being attached to each of said first and second flanges of said two partially overlapping panels, wherein each said post is formed of sheet metal and includes a body interconnecting said two margins, the sheet metal being doubled or tripled over in the margins.

12. The arrangement of claim 11 wherein said pocket faces an interior of the trailer, the post being on an interior side of said flanges.

13. The arrangement of claim 11 wherein said second flange is sandwiched between said first flange and said second margin.

14. The arrangement of claim 11 wherein each said post, a respective said first flange, and a respective said second flange define an air gap therebetween, each said post including at least one aperture, each said aperture being in communication with a corresponding air gap.

15. The arrangement of claim 11 wherein said margins are substantially co-planar with each other, and substantially parallel to a body of said post.

16. The arrangement of claim 11 wherein at least one said post includes an aperture aligned with an outermost portion of the rib.

17. The arrangement of claim 11 wherein the flanges each include both the inside face member and the outside face member throughout a height and throughout a width of the flange.

18. The arrangement of claim 11 wherein the flanges each include both the inside face member and the outside face member throughout a width of the flange.

\* \* \* \* \*